(12) United States Patent
Absenger et al.

(10) Patent No.: US 8,997,961 B2
(45) Date of Patent: Apr. 7, 2015

(54) DUAL CLUTCH ASSEMBLY FOR A TRANSMISSION HAVING TWO INPUT SHAFTS

(75) Inventors: Marc Absenger, Wuppertal (DE); Friedel Lauscher, Kreuzau-Drove (DE); Matthias Doelling, Bergisch-Gladbach (DE); Andreas Hegerath, Bergheim (DE); Hansi Gremplini, Ingersheim (DE)

(73) Assignee: Getrag Ford Trasmissions GmbH, Cologne (DE)

( * ) Notice: Subject to any disclaimer, the term of this patent is extended or adjusted under 35 U.S.C. 154(b) by 343 days.

(21) Appl. No.: 13/392,847

(22) PCT Filed: Aug. 30, 2010

(86) PCT No.: PCT/EP2010/005309
§ 371 (c)(1),
(2), (4) Date: May 8, 2012

(87) PCT Pub. No.: WO2011/023407
PCT Pub. Date: Mar. 3, 2011

(65) Prior Publication Data
US 2012/0241278 A1 Sep. 27, 2012

(30) Foreign Application Priority Data
Aug. 28, 2009 (DE) .......................... 10 2009 039 223

(51) Int. Cl.
*F16D 25/10* (2006.01)
*F16D 25/0638* (2006.01)
*F16D 13/72* (2006.01)
*F16D 21/06* (2006.01)

(52) U.S. Cl.
CPC ............ *F16D 21/06* (2013.01); *F16D 25/0638* (2013.01); *F16D 25/10* (2013.10); *F16D 2021/0607* (2013.01); *F16D 2021/0661* (2013.01)

(58) Field of Classification Search
USPC .................. 192/48.619, 48.618, 85.25, 106 F
See application file for complete search history.

(56) References Cited

U.S. PATENT DOCUMENTS

2004/0206599 A1 10/2004 Hegerath
2006/0042909 A1* 3/2006 De Maziere ............... 192/87.11

(Continued)

FOREIGN PATENT DOCUMENTS

DE 10034730 8/2001
DE 10124213 6/2002

(Continued)

*Primary Examiner* — Gene Crawford
*Assistant Examiner* — Ryan Dodd
(74) *Attorney, Agent, or Firm* — Schlee IP International, P.C.; Anthony R. Schlee

(57) ABSTRACT

A dual clutch arrangement for a transmission that is provided with a first input shaft and a second input shaft has a clutch housing that is connectable to a drive train in a rotationally fixed fashion. The first and second friction clutches can transmit a torque between the clutch housing and the first and the second input shafts, respectively. The first and second friction clutches are nested in the radial direction with respect to each other and actuated by a first and a second actuating unit that have pistons for pressuring clutch disk packs. The compressive force exerted by the piston of the first actuating unit and the compressive force exerted by the piston of the second actuating unit are directed in axially opposite directions with respect to each other.

13 Claims, 13 Drawing Sheets

(56) References Cited

U.S. PATENT DOCUMENTS

| | | | |
|---|---|---|---|
| 2007/0240961 A1* | 10/2007 | Gremplini et al. | 192/87.11 |
| 2007/0256907 A1* | 11/2007 | Gremplini et al. | 192/87.11 |
| 2009/0203453 A1 | 8/2009 | Heinrich et al. | |
| 2009/0223769 A1 | 9/2009 | Nohl et al. | |

FOREIGN PATENT DOCUMENTS

| | | | |
|---|---|---|---|
| DE | 10131766 | 8/2002 | |
| DE | 102006010113 | 9/2007 | |
| DE | 102009006649 | 8/2009 | |
| EP | 1134447 | 9/2001 | |
| EP | 1195537 | 4/2002 | |
| EP | 2182234 | 5/2010 | |
| WO | 03006840 | 1/2003 | |
| WO | 2006048179 | 5/2006 | |
| WO | 2007045418 | 4/2007 | |
| WO | WO 2007045418 A1 * | 4/2007 | F16D 1/08 |
| WO | 2009021582 | 2/2009 | |

* cited by examiner

Figur 1

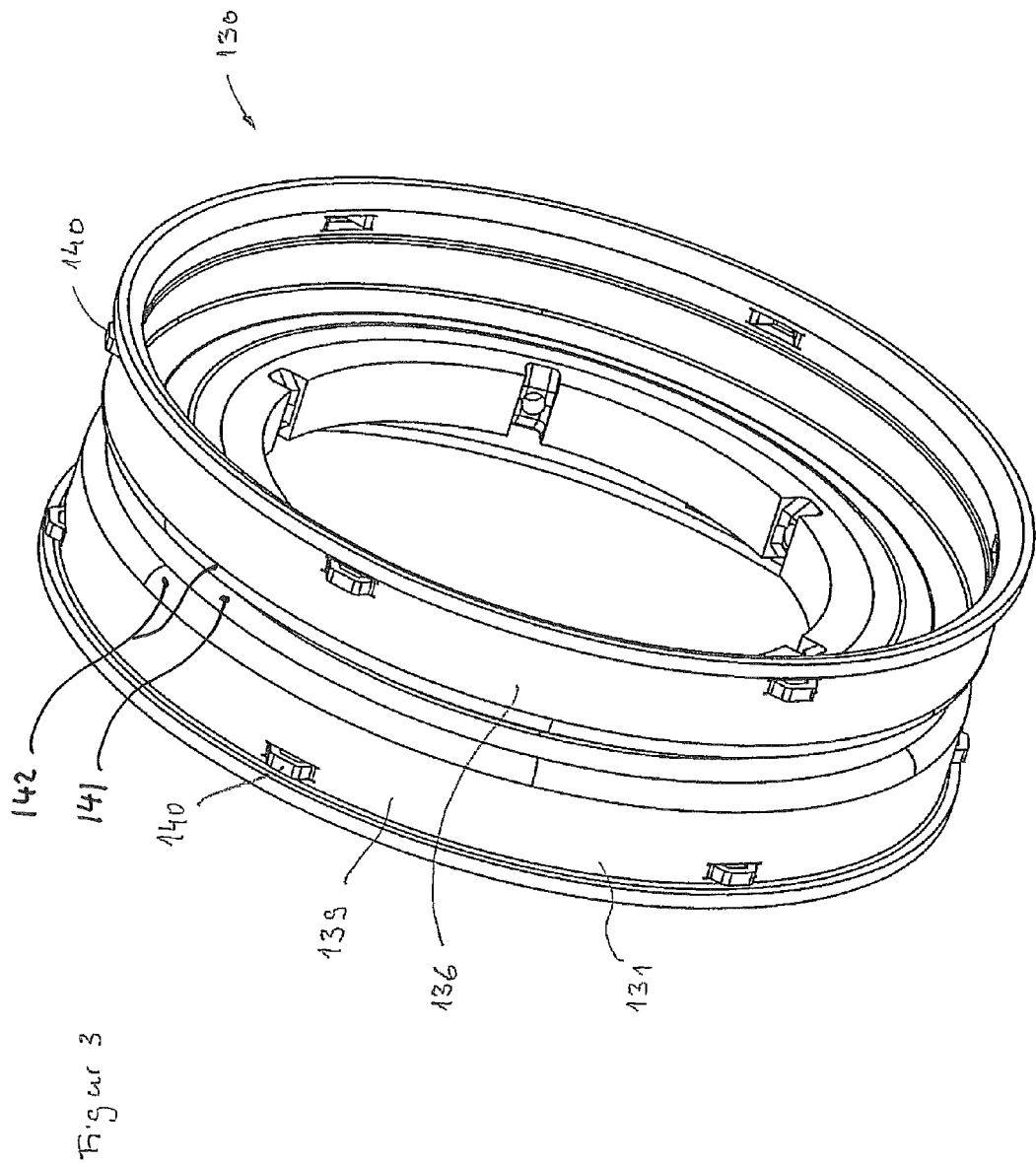

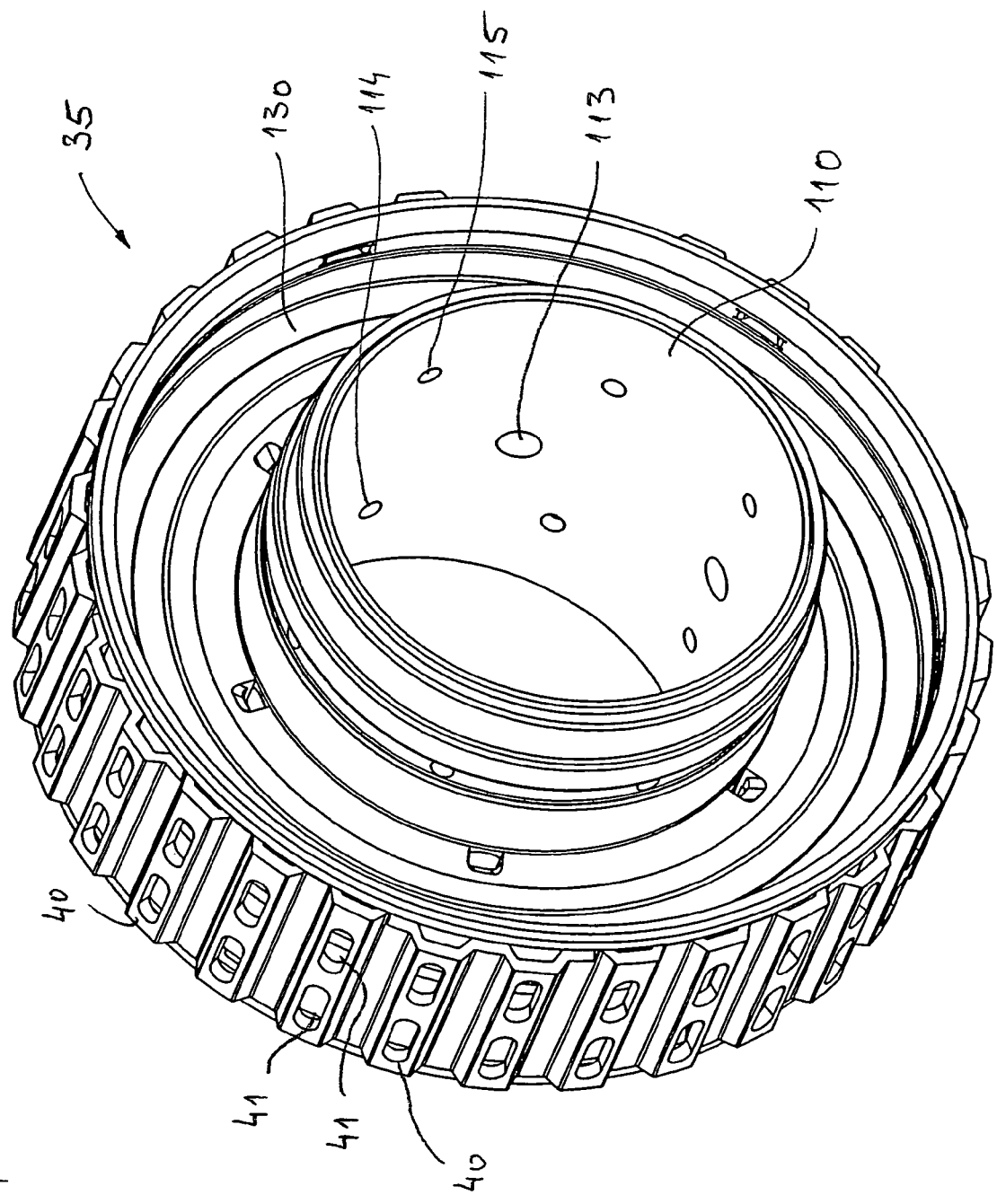
Figur 4

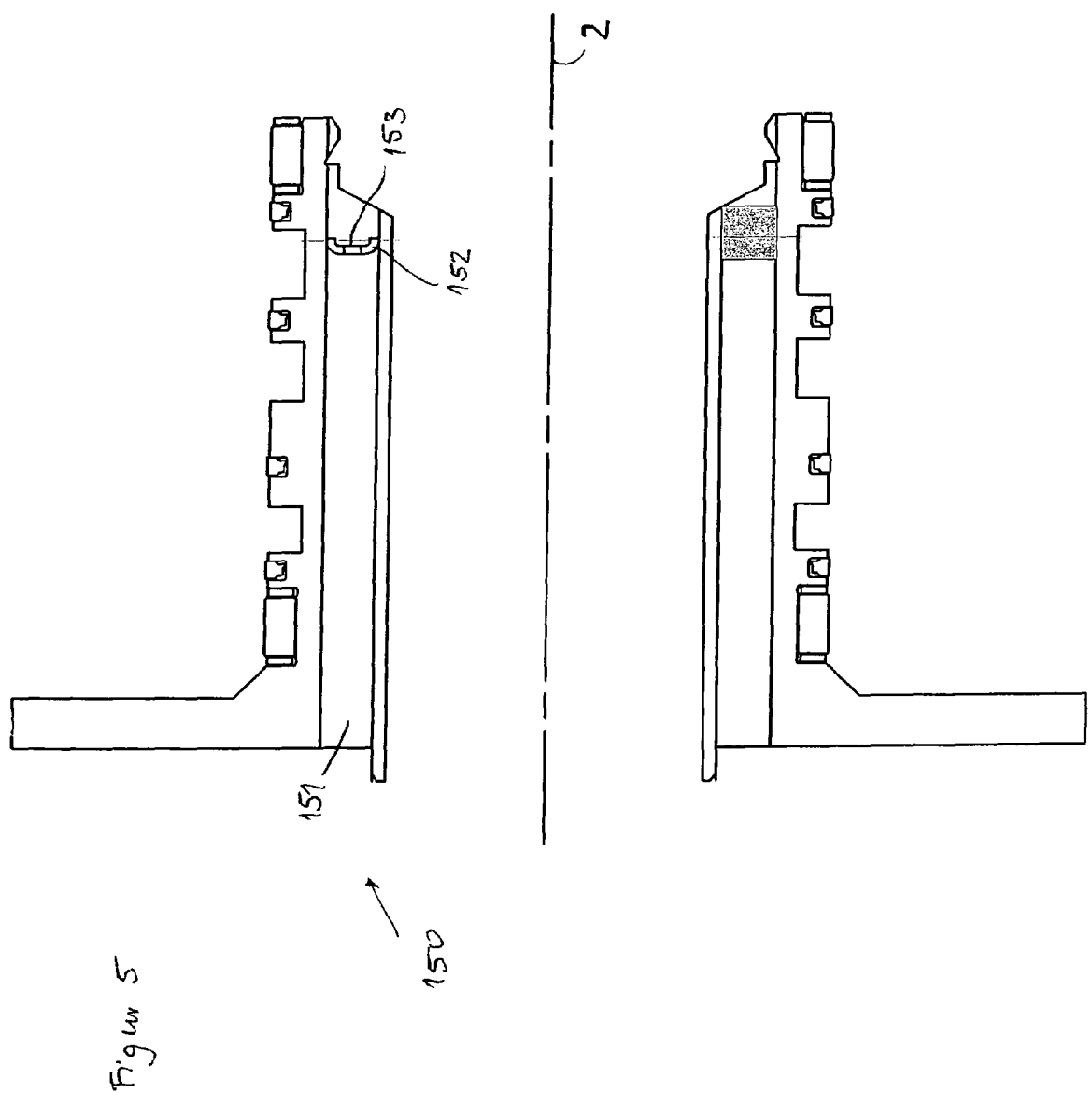

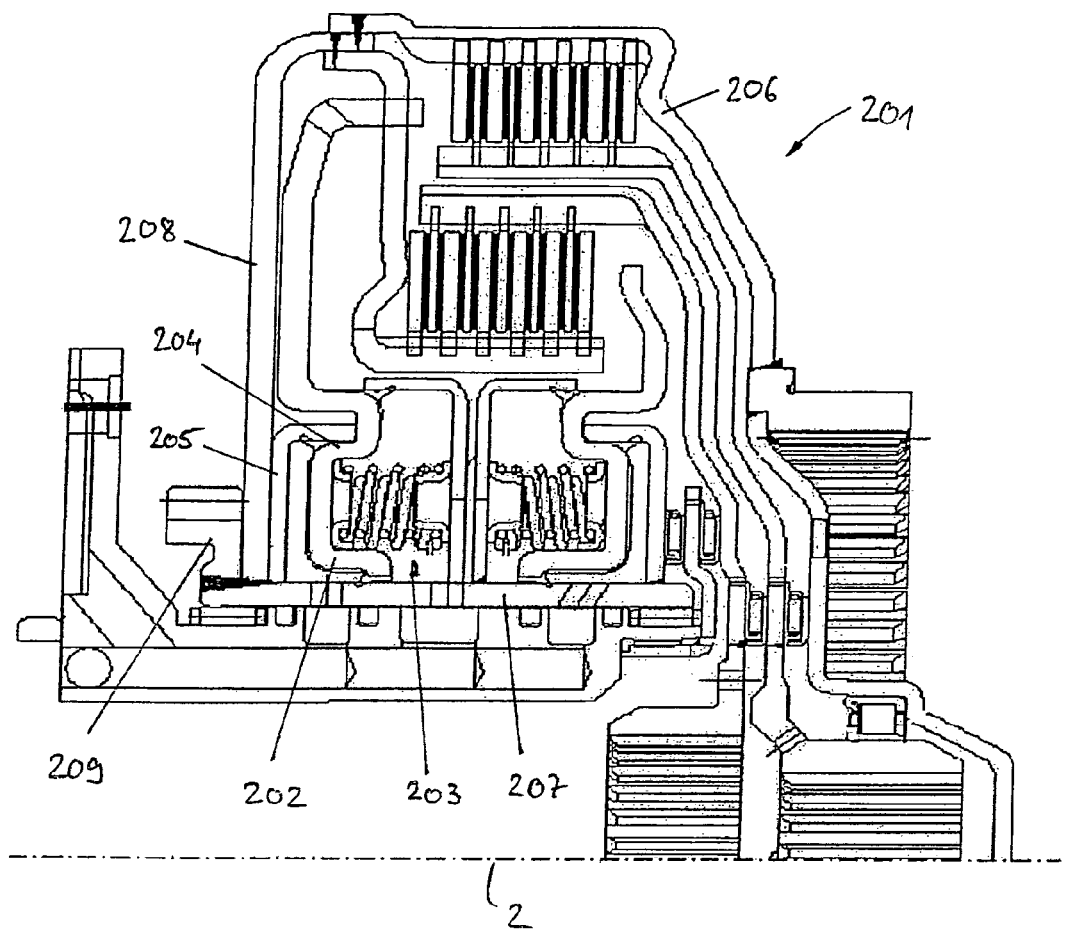
Figur 6

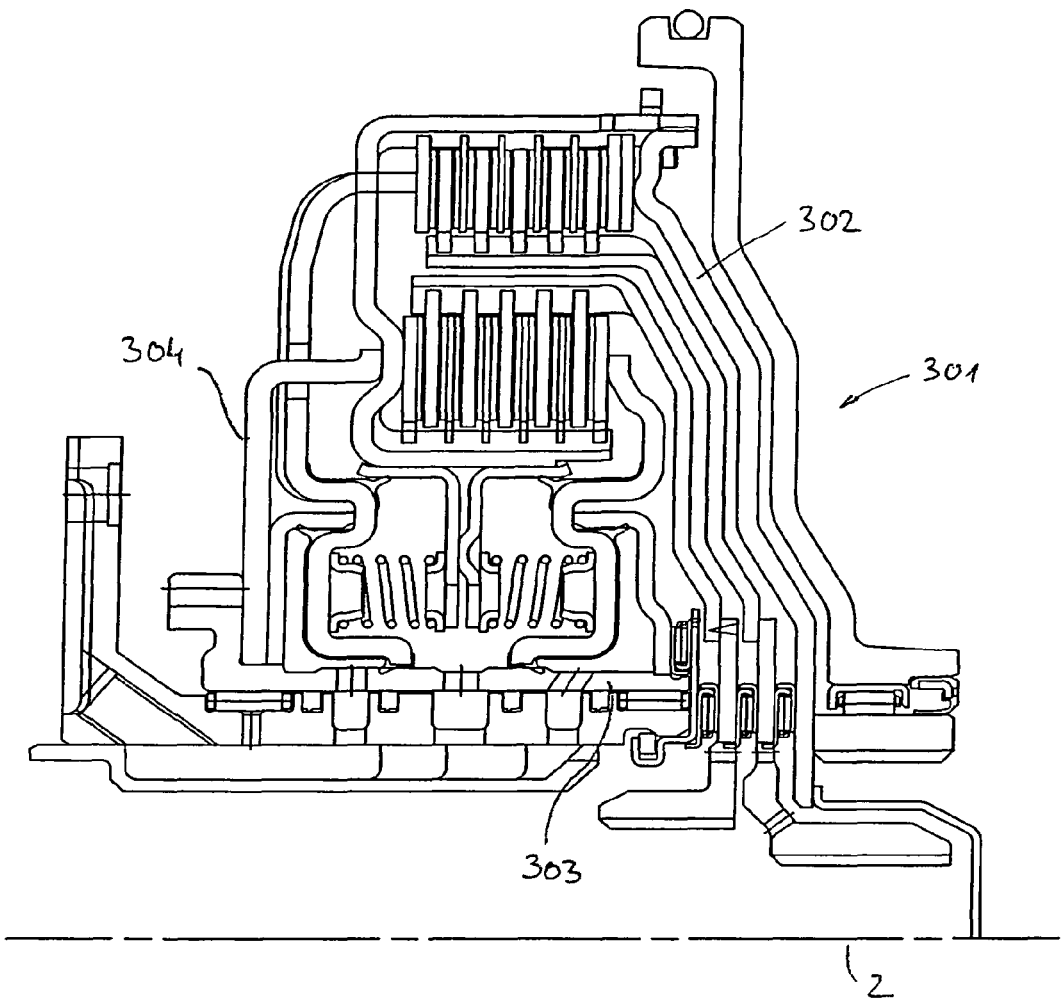
Figur 7

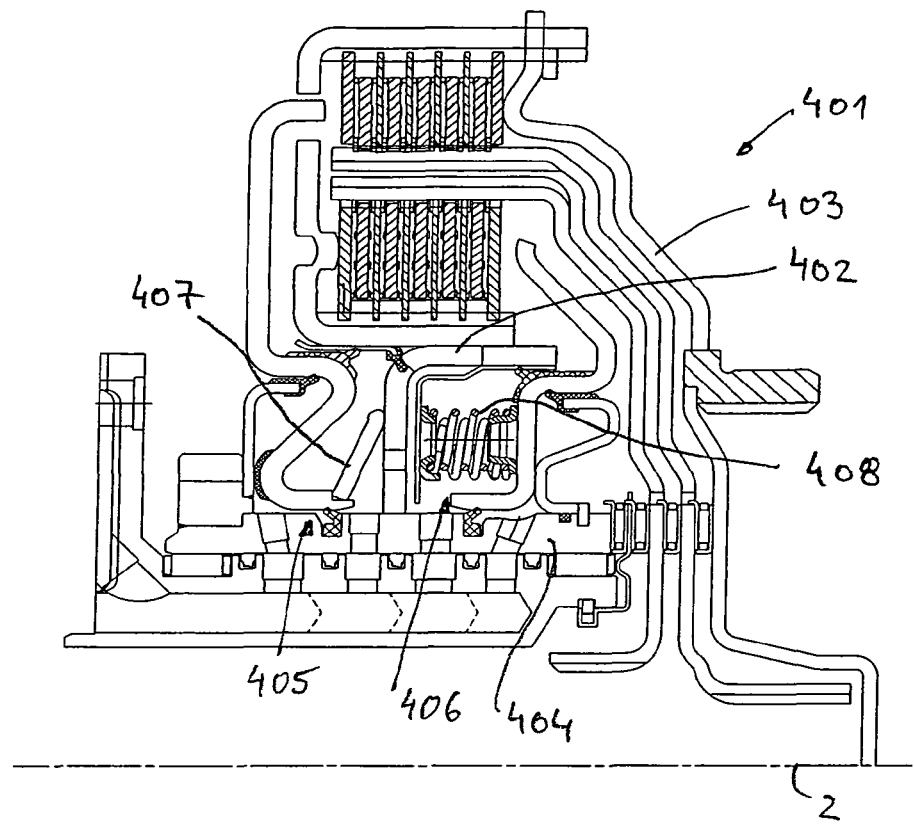
Figur 8

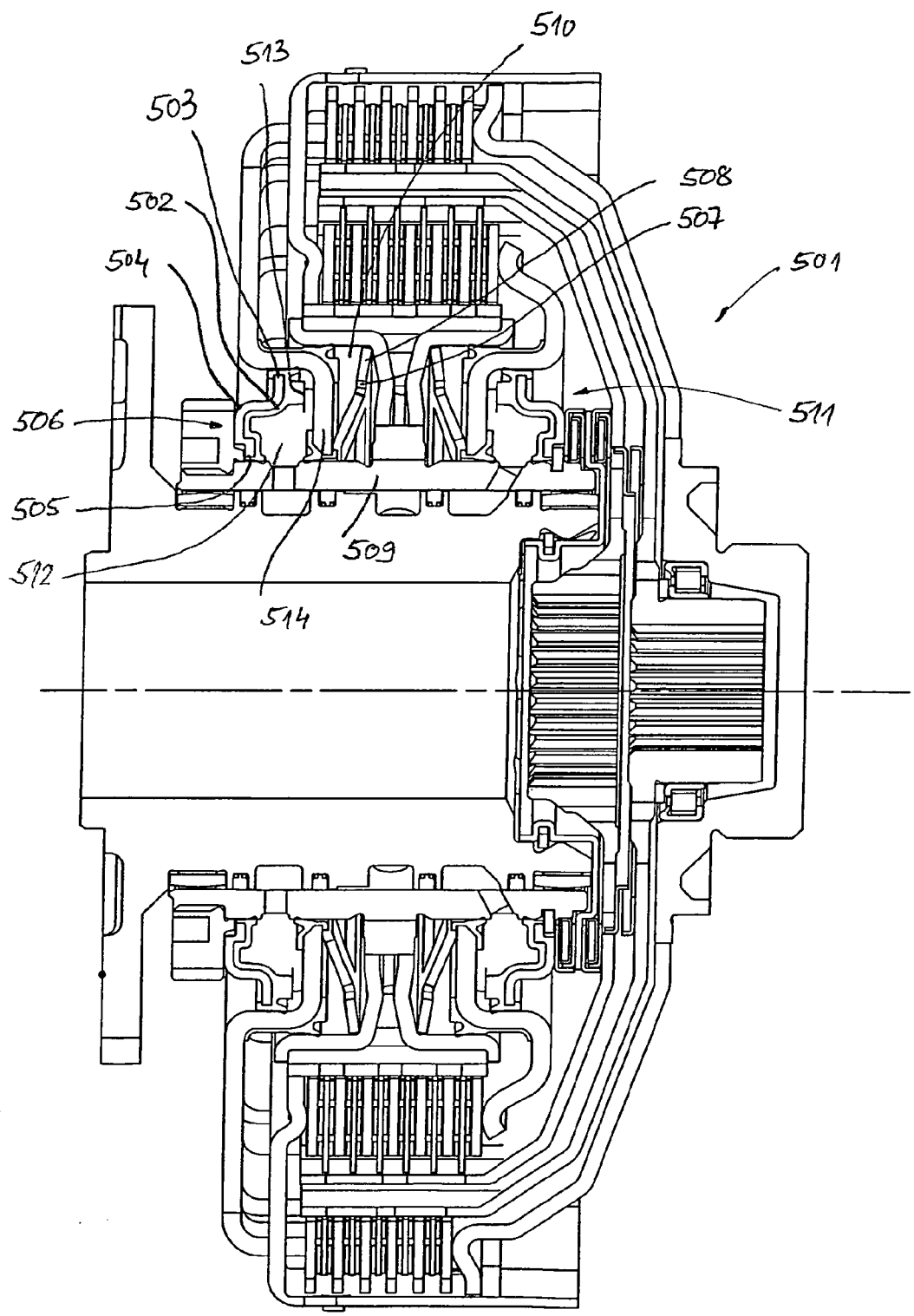
Figur 9

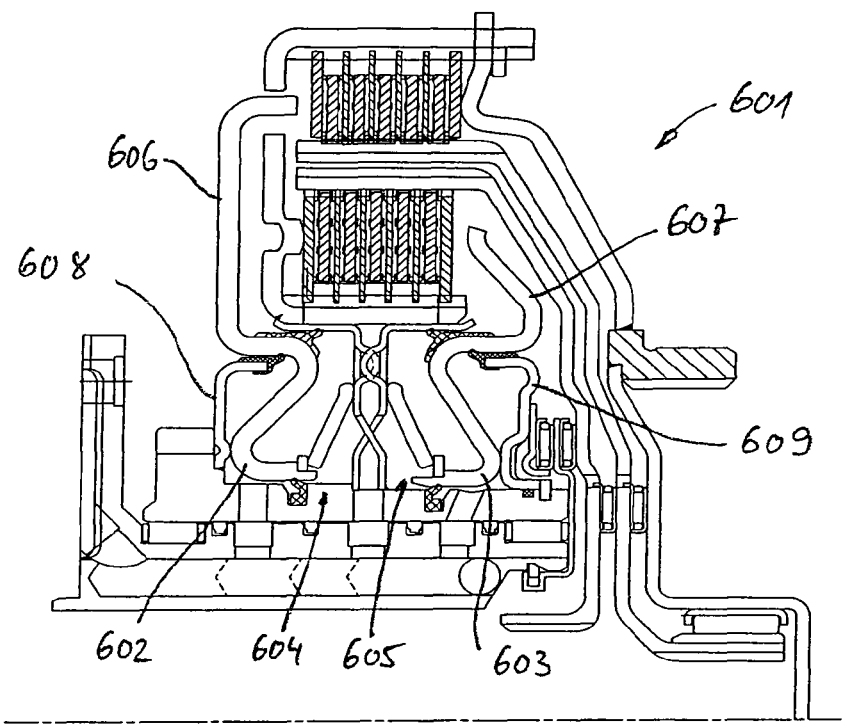
Figur 10

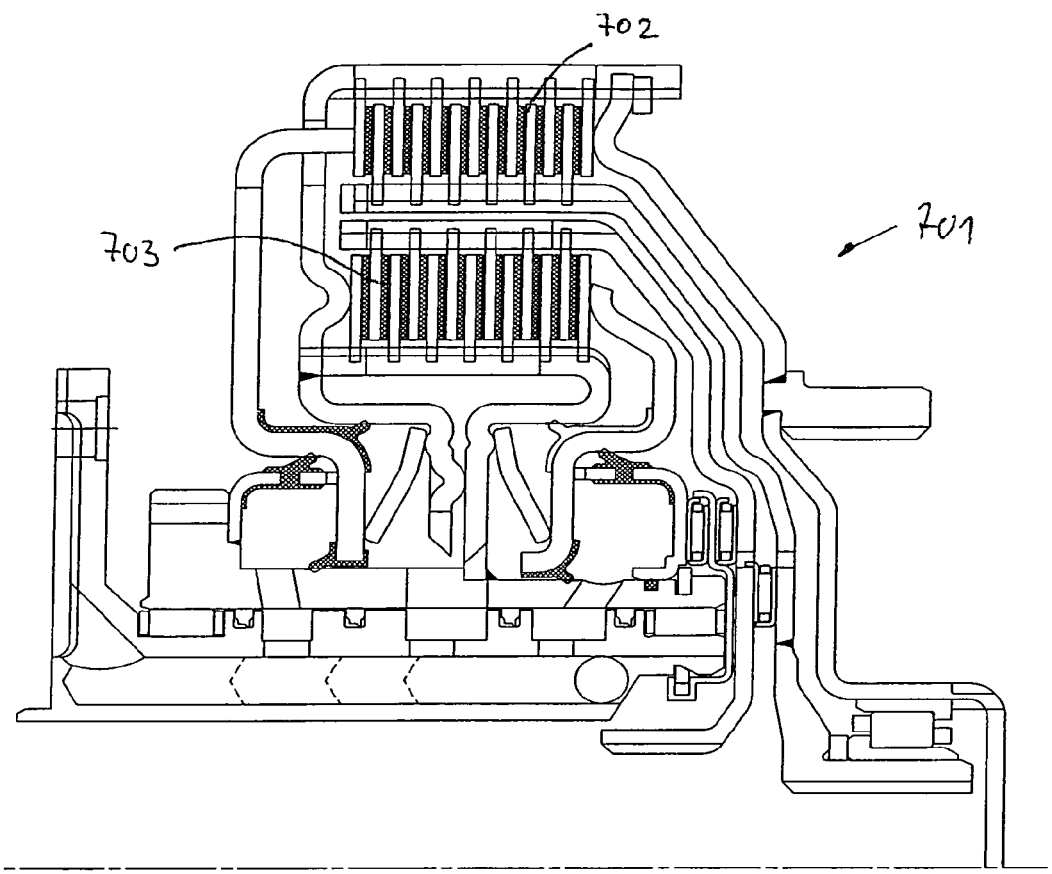
Figur 11

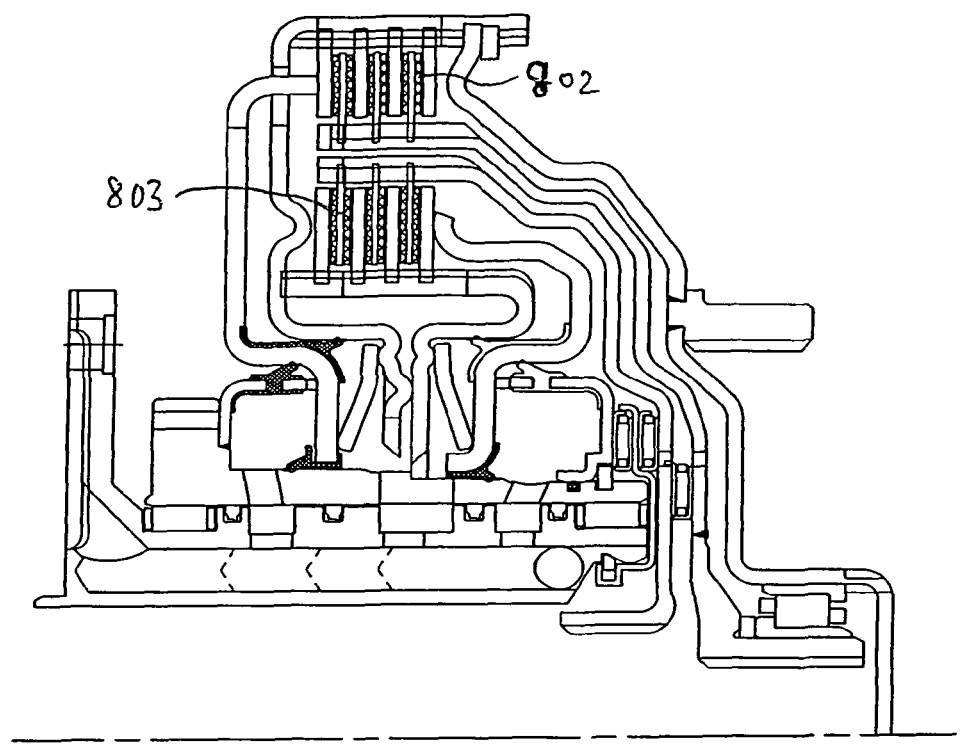
Figur 12

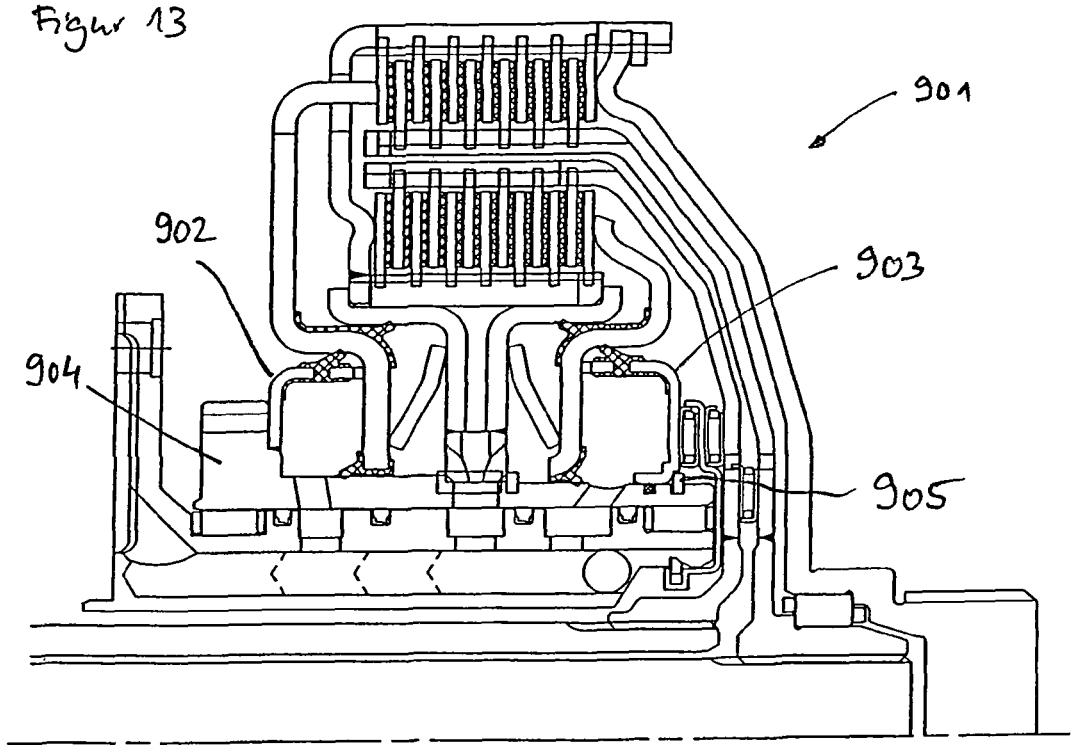

DUAL CLUTCH ASSEMBLY FOR A TRANSMISSION HAVING TWO INPUT SHAFTS

CROSS-REFERENCE TO RELATED APPLICATIONS

This application is a national phase of the International Patent Application PCT/EP2010/005309 filed on Aug. 30, 2010 and published under the publication number WO 2011/023407, claiming the priority of the German patent application 10 2009 039 223.8 that was filed on Aug. 28, 2009. The content of both aforementioned prior applications is herewith incorporated by reference.

BACKGROUND OF THE INVENTION

The invention relates to a dual clutch arrangement for a transmission comprising a first input shaft and a second input shaft.

WO 2009/021582 A1 discloses a dual clutch arrangement with a clutch housing that is connectable to a drive train co-rotating therewith, the clutch housing being designed as a clutch bell housing with a first friction clutch that transmits a torque between the clutch housing and the first input shaft when the first friction clutch is subjected to a compressive force, and with a second friction clutch that transmits a torque between the clutch housing and a second input shaft when the second friction clutch is subjected to a compressive force. The first friction clutch with a clutch disk pack is composed of outer clutch disks and inner clutch disks and is arranged at a radially outward location, while the second friction clutch, also comprising outer clutch disks and inner clutch disks, is arranged at a radially inward location.

The first clutch can be subjected to a compressive force by the first actuating unit that comprises a piston that is axially displaceable and co-rotates with the clutch housing so that the first friction clutch can transmit a torque between the clutch housing, i.e. the drive train, and the first input shaft. Similarly, a second actuating unit for the second friction clutch is provided.

The dual clutch arrangement can be used for an automated dual clutch transmission in a motor vehicle. An important design criterion in the vehicle is the installation space required by such a dual clutch transmission. In a motor vehicle with a transversely mounted engine and correspondingly transversely mounted transmission the axial length of the transmission and therefore also of the dual clutch arrangement should be as short as possible.

In the dual clutch arrangement of WO 2009/021582 A1, the first actuating unit and the second actuating unit are located at a side of the two radially nested friction clutches and which side face away from the drive train, and the actuating units subject the clutch disk packs of the friction clutches to a compressive force by the respective pistons of the actuating units from that side facing away from the drive train.

The arrangement of the two actuating units on one side of the friction clutches, however, necessitates a complex and complicated design of the actuating units with a high number of different component parts.

Also, from EP 1 195 537 B1 a dual clutch arrangement for a dual clutch transmission is known in which a first friction clutch and a second friction clutch that is not nested with the first friction clutch are provided, wherein both friction clutches are provided side by side. However, due to the friction clutches being axially arranged side by side reduction in the axial length of the transmission finds its limit.

SUMMARY OF THE INVENTION

It is an object of the invention to provide a dual clutch arrangement for a transmission with two input shafts, in particular for a dual clutch transmission in a motor vehicle, which dual clutch arrangement has a simple design and a short axial length.

According to an aspect of the invention a compressive force exerted by the piston of the first actuating unit and the compressive force exerted by the piston of the second actuating unit are directed in axially opposite directions with respect to each other. Preferably, the compressive force of the piston of the first actuating unit for the first, radially outer friction clutch acts from a transmission side in the direction of a drive train, while the piston of the second actuating unit for the second, radially inner friction clutch acts from the drive train in the direction of transmission side.

The first friction clutch may include a disk pack with outer disks and inner disks.

The second friction clutch may also comprise a disk pack with outer disks and inner disks, wherein the outer disks of the first friction clutch and the inner disks of the second friction clutch are preferably fixed in a rotationally fashion to the clutch housing. In the radially nested arrangement of the two friction clutches, an inner diameter of the inner disks of the outer friction clutch is larger than an outer diameter of the outer disks of the inner friction clutch. The two disk packs thus lie in a same plane which extends perpendicular to the input shafts.

DETAILED DESCRIPTION OF THE INVENTION

In a preferred embodiment, the inner disks of the outer friction clutch are connected to the first input shaft in a rotationally fixed fashion, said first input shaft being designed as a solid shaft. The outer disks of the inner friction clutch are preferably connected to the second input shaft in a rotationally fixed fashion, said second input shaft being designed as a hollow shaft. The solid shaft and the hollow shaft are preferably arranged coaxially with respect to each other.

The first actuating unit and the second actuating unit are preferably axially symmetric or preferably substantially axially symmetric with respect to each other. Viewed in the radial direction, the substantially axially symmetrically arranged actuating units are radially arranged within the second friction clutch.

The axial symmetry requires the use of identical or very similar components for the actuating units. These components will now be described by first referring to the first actuating unit. This description does apply in analogy also to the components of the second actuating unit and also independently of a mirror symmetry. Thus it is possible that a component of the first actuating unit and/or a corresponding component of the second actuating unit both have characteristics that are described below only with respect to the first actuating unit.

In the embodiment where said friction clutches each comprise disk packs with inner disk and outer disks, the characteristic "radially within the second friction clutch" means that that both a pressure chamber and a compensation chamber of the first actuating unit (and also of the second actuating unit) with the necessary sealings comprise an outer diameter that is smaller than the inner diameter of the inner disks of the inner friction clutch. Also the characteristic "radially within the second friction clutch" should preferably include a radial interleaving so that the friction clutches and the actuating units are not arranged axially offset from each another.

A preferred option is that the piston of the first actuating unit displaceably abuts with a radially inner end of the piston against a clutch hub that co-rotates with the clutch housing. Since also the piston rotates with the clutch housing and is fixed in a rotationally fixed fashion to the clutch housing, there is no rotational speed difference between the piston and the clutch hub so that sealing between the piston and clutch hub can be readily achieved.

In a preferred embodiment, the piston of the first actuating means comprises a radial piston portion and an axial or cylindrical piston portion, wherein between an inner side of the cylindrical piston portion and an outer side of a pressure chamber wall of the first actuating unit a sealing is provided for sealing a pressure chamber. The piston is thus not guided within the pressure chamber wall, but encompasses the latter with its cylindrical piston portion. The sealing can be affixed to the outer side of the pressure chamber wall (for example by vulcanization) so that upon displacement of the piston the cylindrical piston portion slides along the stationary sealing. It is also possible to attach the sealing on the inner side of the cylindrical piston portion or to provide partial sealings at both the pressure chamber wall and the cylindrical piston portion. In order to obtain a very good connection between component part and vulcanized seal, bores, through-holes or the like can be provided in the component part that engages parts of the seal.

Having an inner end which is preferably provided with a seal, the pressure chamber wall may also abut against the clutch hub. Between the pressure chamber wall and the clutch hub there is likewise no rotational speed difference.

A clutch ridge may connect the clutch hub with an inner disk carrier of the second friction clutch, wherein the clutch ridge comprises a radial ridge portion and at least one cylindrical ridge portion. The radial ridge portion thereby bridges the radial distance between the clutch hub and the inner disk carrier of the inner friction clutch. The cylindrical ridge portion serves for providing a rotationally fixed connection between the inner disk carrier of the inner friction clutch and the clutch hub. Due to the clutch ridge, the clutch hub co-rotates with the clutch housing. In addition, the clutch hub, as described in more detail below, transmits a part of the drive torque from the drive train into the clutch hub when the clutch hub serves to drive a (auxiliary) unit.

In a preferred embodiment, a sealing is provided between an inner side of the cylindrical clutch ridge portion and outer side of the cylindrical piston portion of the piston of the first actuating unit for sealing a compensation chamber of the first actuating unit. The clutch ridge therefore has the additional function to provide jointly with the piston a wall for the compensation chamber of the first actuating unit. The compensation chamber ensures pressurizing of a rear face of the piston by an oil pressure that is generated by centrifugal forces so that a pressure increase within the pressure chamber due to centrifugal influences is compensated preferably in its entirety. In this embodiment, additional partitions or the like are not necessary for forming the compensation chamber, simplifying the design of the actuating unit.

The sealing between the outer side of the cylindrical piston portion and the inner side of the cylindrical ridge portion may be vulcanized to the piston portion so that the cylindrical ridge portion is moved relative to the sealing when the first actuating unit is actuated, the piston is displaced axially and the first outer friction clutch builds a torque transmitting capacity.

The clutch member may comprise a divider that divides a fluid flow into a partial fluid flow for cooling at least one of the friction clutches and into at least another partial fluid flow directed to the compensation chamber of the first actuating unit.

The divider that is preferably formed as sintered ring and abuts directly against the clutch hub comprises an input into which the cooling fluid and hydraulic fluid (preferably oil) penetrates from the clutch hub into the divider. The divider interconnects the input to a first output to the compensation chamber of the first actuating unit and to a cooling output that supplies the at least one friction clutch with oil.

Preferably, the divider or the sintered ring are designed in an axially symmetric fashion, wherein the cooling output is designed as a center output that extends in radial direction. The first output for providing the compensation chamber of the first actuating unit with oil corresponds in its shape and design by taking the axial symmetry into account to the second output for supplying oil to a compensation chamber of the second actuating unit.

Preferably, the clutch member consists of two ridge halves, each having a radial portion and a cylindrical portion. Between the radial portions of the ridge halves, a cavity extending in the radial direction is provided, the cavity forming a channel that extends from the cooling output or center output of the divider to the inner disk carrier. Oil can pass through this channel to the second friction clutch. Corresponding radial openings ensure that the oil passes to the outer friction clutch.

It should be noted that the guiding of the partial flow for cooling of at least one of the friction clutches through the cavity of the clutch ridge does not necessarily need to be tied to the above-described feature of the two ridge halves of the clutch ridge. For example, the partial flow may also be guided only through one or more radial holes in the radial ridge portion of the clutch ridge.

In a preferred embodiment, the pressing force is transmitted by a pressing body of the piston of the first actuating unit onto the disk pack of the first friction clutch. The pressing body or pressure ring bridges primarily the radial distance between the disk pack of the first outer clutch and the piston of the first actuating unit, which piston preferably abuts against the clutch hub and is axially movable and can thus lie substantially further inwards in the radial direction. The pressing body is preferably integrally molded on the piston so that it is, for instance, possible to manufacture the piston and pressuring body from one piece of metal sheet by a deep-drawing process or forming process.

Preferably, the piston of the first actuating unit and a piston of the second actuating unit are identical. The piston of the actuating units should also be considered as identical even when the integrally formed pressing bodies of the respective pistons differ from each other. Since the second friction clutch is provided radially further inward, the pressing body for the disk pack of the second friction clutch needs to bridge only a shorter radial distance to the piston of the second actuating unit compared to the pressing body of the first actuating unit.

The pressure chamber wall of the first actuating unit and a pressure chamber wall of the second actuating unit may be of identical design. In addition, the compensation chamber of the first actuating unit and the compensation chamber of the second actuating unit may be of identical design, so that the two actuating units, apart from the different pressing bodies and the axial mirror symmetry are structured identically. The above description that refers to the first actuating unit applies therefore in analogy also to the component parts of the second actuator.

Having both actuating units of the same structure reduces the number of different component parts in the dual clutch arrangement. This leads to a particularly simple design of the dual clutch arrangement.

The clutch hub may have at least one oil hole that opens into an oil groove with rounded or bevelled groove walls. Possible burrs generated in the manufacturing process do therefore not project beyond an outer circumferential surface of the clutch hub, preventing damage to sealings by such burrs when the sealings must be slid along the outer surface and over the oil holes of the clutch hub during an assembly process of the dual clutch arrangement. It is understood that the use of this preferred clutch hub according to a particular embodiment of the dual clutch arrangement is independent of the remaining inventive structure thereof.

Preferably, a clutch support is provided on which the clutch hub can rotate and that comprises at least one oil bore and a plug for closing that oil bore, wherein said plug has a defined leakage opening. By this defined leakage opening additional component parts of the dual clutch arrangement or of the transmission can be supplied with oil in a defined manner.

The clutch hub can be provided at an end facing away from the drive train with a shoulder for receiving in a rotationally fixed fashion a pump wheel. The pump wheel drives a pump for providing a necessary operating pressure for the oil supply of the dual clutch assembly or of the entire transmission. The corresponding torque for the pump wheel is transmitted from the drive train via the clutch housing into the clutch hub.

Preferably, the torque is transmitted from the clutch housing into the pump wheel that is connected in a rotationally fixed fashion with clutch hub via the clutch ridge. The clutch ridge is preferably provided in the axial direction between the pressure chambers of said first and second actuating units. This embodiment allows that the pressure chamber wall of the first actuating unit and the pump wheel abut against each other in the axial direction, meaning that no part for torque transmission is provided axially between the pressure chamber wall and pump wheel.

Alternatively or additionally, it is however also possible to transmit torque to the pump wheel by a corresponding component part that may be positioned in the axial direction between the pump wheel and pressure chamber wall of the first actuating unit, that is the actuating unit that is provided at a longer distance from the drive train.

BRIEF DESCRIPTION OF THE DRAWINGS

The invention is described in further detail by the embodiments of the invention shown in the drawing. In the drawings:
FIG. 3 is a pressure chamber wall;
FIG. 4 shows a clutch ridge;
FIG. 5 shows a clutch support
FIG. 6 shows another embodiment of the invention;
FIG. 7 shows another embodiment of the invention;
FIG. 8 shows another embodiment of the invention;
FIG. 9 shows another embodiment of the invention;
FIG. 10 shows another embodiment of the invention;
FIG. 11 shows another embodiment of the invention;
FIG. 12 shows another embodiment of the invention;
FIG. 13 shows another embodiment of the invention.

DETAILED DESCRIPTION OF THE DRAWINGS

Figure 1:
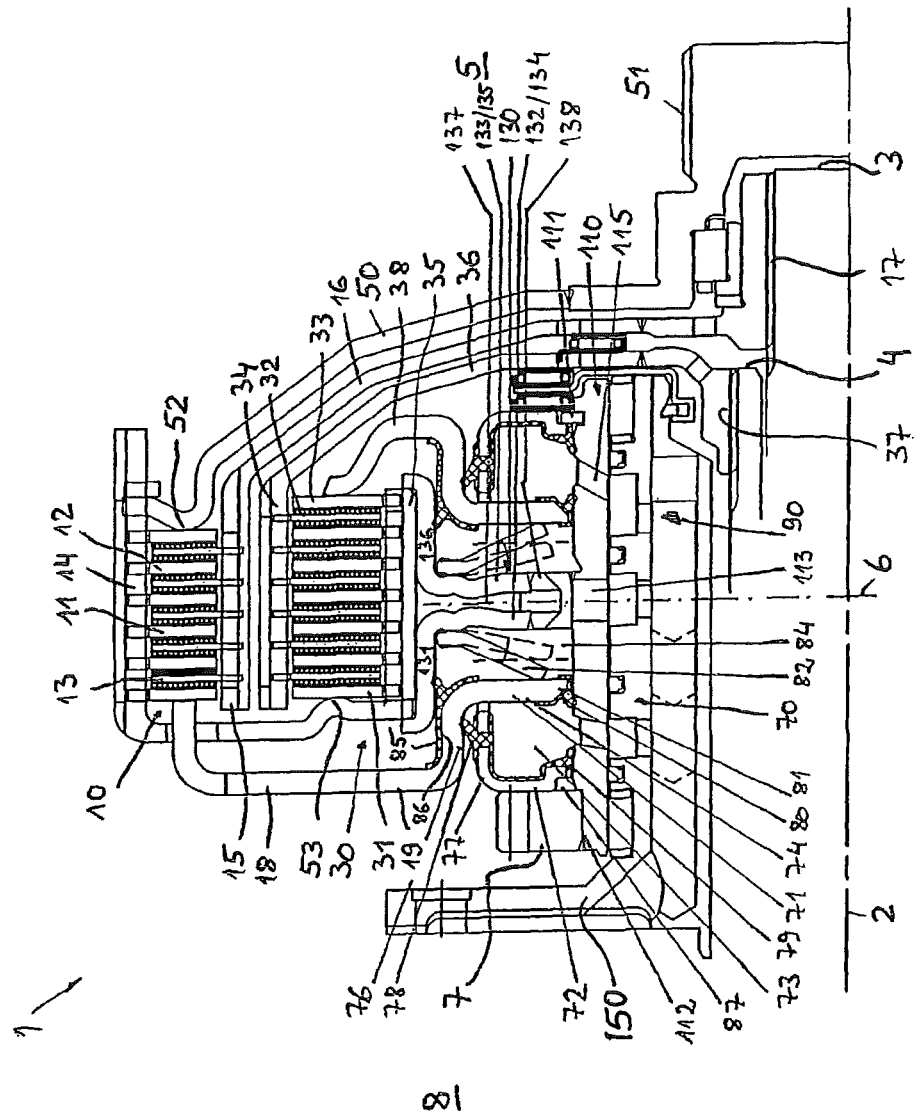
FIG. 1 shows a first embodiment of the invention.

FIG. 1 shows a longitudinal section of one half of a dual clutch arrangement, which is designated in its entirety by reference numeral 1. The dual clutch arrangement 1 is substantially rotation-symmetric with respect to a rotation axis 2.

The dual clutch arrangement 1 is designed for a transmission, of which is shown in FIG. 1 only partially a first input shaft 3 and a second input shaft 4. The input shafts 3, 4 are arranged coaxially to the axis of rotation 2, wherein the second input shaft 4 is formed as a hollow shaft. The transmission can be a dual clutch transmission in a motor vehicle having a first and a second partial transmission. Between the partial transmissions, each of which being allocated to one of the input shafts, and a non-shown drive train (motor), the dual clutch arrangement 1 is interconnected. By the dual clutch assembly 1, it is possible to transmit torque from the drive train to the first input shaft 3 and/or the second input shaft 4.

The dual clutch arrangement 1 comprises a first friction clutch 10 and a second friction clutch 30. The friction clutch 10 includes a clutch disk pack 11, which consists of outer disks 12 and inner disks 13. The outer disks 12 are in a rotationally fixed fashion but axially (parallel to the axis of rotation 2) slidably connected to an outer disk carrier 14, the latter being in a rotationally fixed fashion connected with a clutch housing 50. The clutch housing 50 is supported by bearings such that the clutch housing is rotatable around the rotation axis 2 and transmits drive torque via the outer toothing 51 from the drive train into the dual clutch arrangement 1. The inner disks 13 are also fixed in their circumferential direction and axially slidably with respect to an inner disk carrier 15.

Radially inside of the disk pack 11 of the first friction clutch 10 a disk pack 31 of the second friction clutch 30 is arranged. The disk pack 31 is composed of outer disks 32 and inner disks 33. In a rotationally fixed fashion but axially displaceably the outer disks 32 are connected to an outer disk carrier 34 while the inner disks 33 are connected in the same fashion with an inner disk carrier 35.

A first friction clutch 10 and second friction clutch 30 are with their respective disk packs 11, 31 arranged in a radial nested fashion with respect to each other. The first friction clutch 10 is placed radially outward and it is therefore also referred to in the following as "outer friction clutch". Accordingly, in the following, the second friction clutch 30 is also referred to as "inner friction clutch".

Not only the outer disk carrier 14 of the outer friction clutch 10, but also the inner disk carrier 35 of the inner friction clutch 30 is connected to the clutch housing 50 in a circumferentially fixed fashion so as to co-rotate therewith. The outer disk carrier 14 and the inner disk carrier always co-rotate with the clutch housing.

Not shown is that at a radially outward location of the clutch housing a rotor can connect to an electric machine motor that may enclose the two friction clutches 10, 30. The electric machine allows driving the clutch housing in the alternative or in addition to the drive train.

For example, if the inner disks 13 and the outer disks 12 are axially compressed against a stop 52, the first friction clutch 10 provides a torque transmitting capacity. This allows transmitting torque from the drive train to the first input shaft 3, wherein the torque flow takes place from the clutch housing 50 and outer disk carrier 14 via the clutch disk pack 11 to the inner disk carrier 15. The inner disk carrier 15 is in a rotationally fixed fashion connected to a first clutch bell housing 16 and is connected via a serration 17 to the first input shaft 3.

The same applies to the second friction clutch 30. If the disks 32, 33 are axially pressed against a stop 53 a torque can be transmitted into the second input via a second clutch bell housing 36.

Subjecting the disk pack 11 of the outer friction clutch 10 to an axial compressive force is performed by an actuating unit 70. The actuating unit 70 has an axially displaceable piston 71 that defines in connection with an axially fixed pressure chamber wall 72 a pressure chamber 73. If an oil pressure is built up in the pressure chamber 73, the piston 71 presses via an integrally formed contact pressing body 18, the disk pack 11 of the outer friction clutch together and the pressure force of the piston 71 is directed towards the drive train side 5.

The piston 71 has a radial piston portion 74 and a cylindrical piston portion 75. The cylindrical piston portion 75 is integrally connected via a radial section 19 to the contact pressing body 18. Between an inner side 76 of the cylindrical piston portion 75 and a cylindrical outer face 77 of the pressure chamber wall 72 a sealing 78 is provided that is vulcanized to the pressure chamber wall 72.

Sealing the pressure chamber 73 versus a clutch hub 110 co-rotating with the clutch housing 50 is accomplished by the sealings 79, 80. The sealing 80 is located at an inner end 81 of the piston 71.

If the pressure chamber 73 is vented, a return spring 82 presses the piston 71 against a stop 83 of the pressure chamber wall 72. Accordingly, the disk pack 11 of the outer friction clutch is no longer compressed so that except for a drag torque no torque is transmitted any longer by the outer friction clutch.

In order to avoid influences of centrifugal force, the actuating unit 70 has a compensation chamber 84 housing the return spring 82. The compensation chamber 84 is bounded on one side by the piston 71 and on the other side by a clutch ridge 130 that connects the clutch hub 110 to co-rotate with the inner disk carrier 35 of the inner clutch 30 and with the clutch housing 50. The sealing of the compensation chamber 84 is accomplished by a sealing 85 located between an outer side 86 of the cylindrical piston portion 75 and a cylindrical ridge portion 131 of the clutch ridge 130.

The clutch ridge 130 that will be discussed in more detail below is substantially axially symmetric with respect to a mirror axis 6. With respect to this mirror axis 6 also the first actuating unit 70 and a second actuating unit 90 are axially symmetric, so that reference to the detailed description to the first actuating unit 70 is made with regard to the second actuating unit 90. Component parts of the actuating unit 90 that are identical to the component parts of the actuating unit 70 in the embodiment of FIG. 1 are denoted by reference numerals that are increased by 20.

As FIG. 1 shows, the pressure chamber walls 72, 92 of the actuating units are identical. This also applies to a shoulder 107 and a respective shoulder 87, which is used for abutting against or receiving a snap ring 111 for providing axial support of the compression chamber wall 92 of the second actuating unit 90. In the first actuating unit 70, however, this shoulder 87 has no function since here the pressure chamber wall is supported by a pump wheel 7, which sits on a shoulder 112 of the clutch hub 110 and is firmly connected therewith.

It is noted that the piston 91 of the second actuating unit 90 acts in the direction of a transmission side 8, i.e. acts in the opposite direction compared to the piston 71 of the first actuating unit 70. It is also noted that that a contact body 38 of the second friction clutch and that is likewise integrally formed on the piston 91 comprises a shorter radial portion 39.

As noted above, the clutch ridge 130 is designed axially symmetric with respect to a mirror symmetry axis 6. The clutch ridge 130 is composed of two ridge halves 132, 133, each having a radial ridge portion 134, 135. The ridge half 132 includes a radial ridge portion 134 and the above-mentioned cylindrical ridge portion 131. The other ridge half 133 has a cylindrical ridge portion 136.

The cylindrical ridge portions 131, 136 are not identical since the cylindrical ridge portion 131 is slightly longer than the cylindrical ridge portion 136 for forming a circumferentially fixed connection with the connector housing 50.

Between the radial ridge portions 134, 135 a channel 137 is formed, allowing oil to flow from a middle oil hole or several middle oil holes 113 of the clutch hub 110 to the friction clutches 10, 30 for cooling purposes. The oil passes a divider in form of a sintered ring 138 dividing the flow of oil through the oil holes 113 into three partial oil flows. A central partial oil flow leads into the channel 137. The other partial oil flows are led through the sintered ring 138 into the compensation chambers 84 and 104, respectively.

Figure 2:
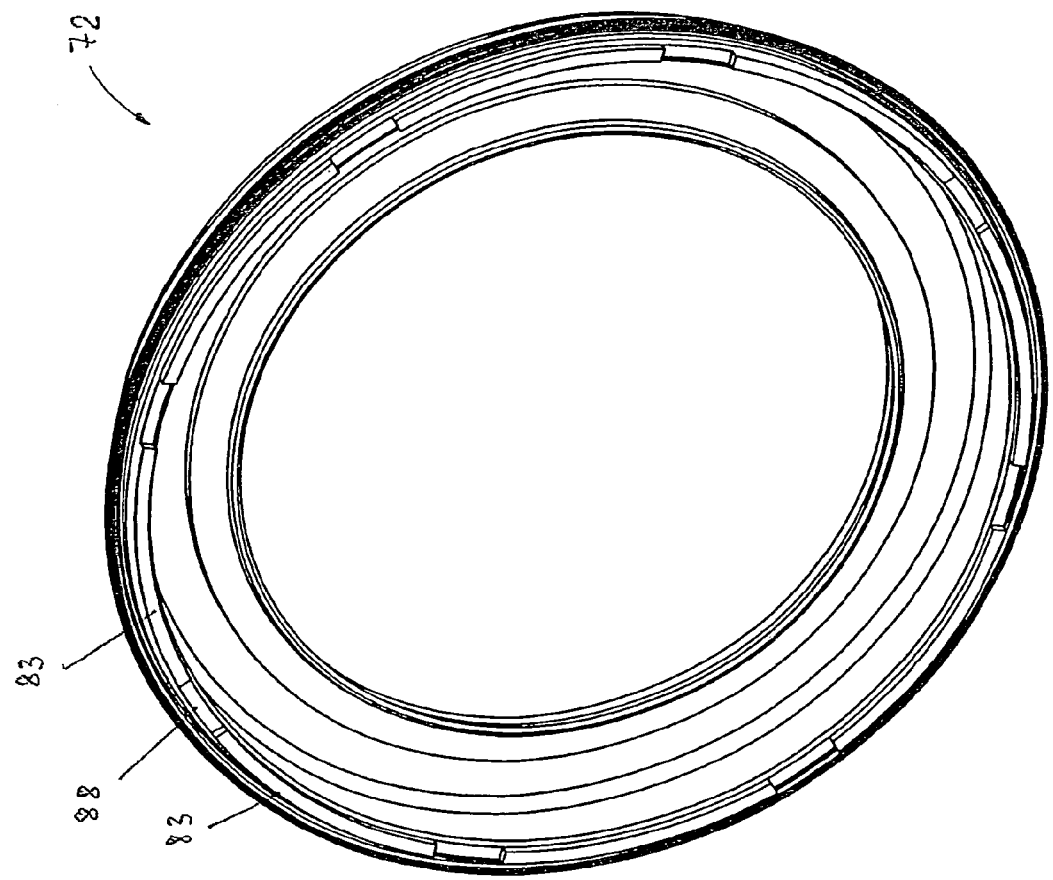
FIG. 2 shows a clutch support.

FIG. 2 shows a perspective view of the pressure chamber wall 72, wherein the circumference comprises at equal intervals a plurality of stops 83 against which the return spring 82 pushes the piston 71 when the pressure chamber 73 is provided pressureless. Between two adjacent stops 83 an overflow passage 88 is formed to guarantee that the sealing 78 does not run dry.

FIG. 3 shows a perspective view of the clutch ridge 130 having at its cylindrical ridge portions 131, 136 on a cylindrical outer surface 139 outwardly directed protrusions 140. The protrusions 140 provide a positive interlocking between the clutch ridge 130 and the inner disk carrier 35 of the second friction clutch 30 in the circumferential direction. In addition, the dividers 138 are shown dividing the partial flows to cool the friction clutches 10, 30 and to supply the compensation chambers 84, 104. An oil groove 140 is provided with rounded or chamfered groove walls 141 and (see FIG. 1) is connected with at least one oil bore 113 that is provided in the clutch hub 110.

FIG. 4 shows the inner disk carrier 35 with the clutch ridge 130 and the clutch hub 110. The inner disk carrier 35 has tooth-like projections 40 engaging corresponding recesses in the inner disks 33 of the second friction clutch 30. Each protrusion 40 has two passages 41 through which the partial flow for cooling of the friction clutches can flow radially further outwards. Shown are also the oil bores in the clutch hub 110. These are the center oil bores 113 through which oil flows to the compensation chambers 84, 104 or to the friction clutches 10, 30. Through the outer holes 114, 115, the pressure chambers 73, 93 are supplied with oil.

FIG. 5 shows a longitudinal section of the fixed clutch support 150 with an axial bore 151 though which oil is passed to the oil holes 113, 114 and 115 of the clutch hub 110. The axial bore 151 is closed at its end by a plug 152 that does, however, comprise a small leakage opening 153 through which the serrations 17, 37 (see FIG. 1) can be supplied with oil.

In the following figures of further embodiments of the invention are described and the differences compared to the embodiment shown in FIG. 1 are pointed out. With respect to the common features with the embodiment shown in FIG. 1, it is referred to the specific description of FIG. 1.

FIG. 6 shows dual clutch arrangement denoted 201 in which a piston 202 of a first actuating unit 203 has an axial piston portion 204 which is encompassed from its outer side in the radial direction by a pressure chamber wall 205. The fixed connection in the circumferential direction between a clutch housing 206 and a clutch hub 207 is provided by a radial housing portion 208 that abuts in the immediate vicinity of a pump wheel 209 against the clutch hub 207.

FIG. 7 shows a dual-clutch arrangement 301 providing in a rotationally fixed manner a connection between the clutch housing 302 and clutch hub 303 as shown in FIG. 1, but not via a central clutch ridge and instead via a radial housing section 304.

FIG. 8 shows a dual clutch assembly 401 comprising an asymmetrical clutch ridge 402 transmitting torque from a clutch housing 403 to a clutch hub 404. The asymmetry of the clutch ridge 402 results in two differently designed actuators 405, 406. The actuating unit 405 also has as a return spring that is designed as a Belleville spring 407, while a helical spring 408 is inserted into the actuating unit 406. The pump wheel 409 is welded to the clutch hub 404. It would also be possible to connect the pump wheel via a toothing in a circumferentially fixed fashion with the clutch hub and to fix it in axial direction via a snap ring or the like.

In FIG. 9 which shows, in contrast to the FIGS. 1 and 5-8 a non-halved longitudinal section of another embodiment, a dual clutch arrangement is shown in which a sealing 502 (preferably made of rubber) extends from a radially outer end 503 of a pressure chamber wall 504 of a first actuating unit 506 continuously to a radially inner end 505 of the pressure chamber wall 504, preferably at a side that faces the pressure chamber 512. The sealing 502 thereby also forms a piston stop 513 against which a piston 514 abuts when the pressure chamber 512 is depressurized. The piston stop 513 and/or the piston 514 are adapted to allow oil distribution throughout the entire pressure chamber 512 (for example by openings or passages in the circumferential direction) even when the piston 514 abuts against the piston stop 513.

Further, FIG. 9 shows an opening 507 in a saucer spring 508 allowing oil coming from a clutch hub 509 to spread at almost no resistance in a compensation chamber 510. Reference is also made to the symmetry of the first actuating unit 506 and a second actuating unit 511 with identical components.

FIG. 10 shows in contrast an embodiment 601 having identically formed pistons 602, 603 of the two actuating units 604, 605 which are identical with respect to each other apart from the different pressing bodies 606, 607. However, the pressure chamber walls 608, 609 of the actuating units 604, 605 are formed differently with respect to each other.

Dual clutch arrangements 701 and 801 of FIGS. 11 and 12 differ in the number of disks in the disk packets 702, 703 and 801, 802, respectively. While the dual clutch arrangement 701 is designed to transmit higher torque, the dual clutch arrangement 801 allows for transmitting only a smaller maximum torques.

The dual clutch arrangement 901 of FIG. 13 differs from the embodiment of FIG. 1 by the differently designed pressure chamber walls 902, 903. While in the embodiment of FIG. 1, the two pressure chamber walls 72, 92 are formed identically, here there are some differences since the pressure chamber wall 902 is directly supported at the pump wheel 904 and the pressure chamber wall 903, as in FIG. 1, is supported against a circlip or snap ring 905.

LIST OF REFERENCE NUMERALS 1 dual clutch arrangement
2 rotation axis
3 first input shaft
4 second input shaft (hollow shaft)
5 output side
6 mirror axis
7 pump wheel
8 transmission side
10 first friction clutch
11 disk pack
12 outer disk
13 inner disk
14 outer disk carrier
15 inner disk carrier
16 first clutch bell housing
17 serration connection
18 pressing body
19 radial section
20 protrusion
21 passage
30 second friction clutch
31 disk pack
32 outer disk
33 inner disk
34 outer disk carrier
35 inner disk carrier
36 second clutch bell housing
37 serration connection
38 pressing body
39 radial section
50 clutch housing
51 toothing
52 stop
53 stop
70 first actuator
71 piston
72 pressure chamber wall
73 pressure chamber
74 radial piston portion
75 cylindrical piston portion
76 inner side
77 outer side
78 sealing
79 sealing
80 sealing
81 inner end
82 return spring
83 stop
84 compensation chamber
85 sealing
86 outer side
87 shoulder
88 overflow passage
90 second actuating unit
110 clutch hub
111 circlip/snap ring
112 shoulder
113 center oil bore
114 outer oil bore
115 outer oil bore
130 clutch ridge
131 cylindrical ridge section
132 ridge half
133 ridge half
134 radial ridge portion
135 radial ridge portion
136 cylindrical ridge portion
137 channel
138 sintered ring (divider)
139 outer face 140 protrusions
150 clutch support
151 axial bore
152 plug
153 leakage opening
201 dual clutch arrangement
202 piston
203 actuating unit
204 axial piston portion
205 pressure chamber wall
206 clutch housing
207 clutch hub
208 radial housing portion
209 pump wheel
301 dual clutch arrangement
302 clutch housing
303 clutch hub
304 radial housing portion
401 dual clutch arrangement
402 clutch ridge
403 clutch housing
404 clutch hub
405 actuating unit
406 actuating unit
407 Belleville spring
408 helical spring
501 dual clutch arrangement
502 actuating unit
503 inner end
504 pressure chamber wall
505 outer end
506 first actuating unit
507 opening
508 Belleville spring
509 clutch hub
510 compensation chamber
511 second actuating unit
512 pressure chamber
513 piston stop
514 piston
601 dual clutch arrangement
602 piston
603 piston
604 actuating unit
605 actuating unit
606 pressing body
607 pressing body
608 pressure chamber wall
609 pressure chamber wall
701 dual clutch arrangement
702 disk pack
703 disk pack
801 dual clutch arrangement
802 disk pack
803 disk pack
901 dual clutch arrangement
902 pressure chamber wall
903 pressure chamber wall
904 pump wheel
905 circlip/snap ring

What is claimed is:

1. A dual clutch arrangement for a transmission comprising a first input shaft and a second input shaft, the dual clutch arrangement comprising:
a clutch housing that is attachable to a drive train in a rotationally fixed fashion;
a first friction clutch that when subjected to a compressive force transmits a torque between the clutch housing and the first input shaft;
a second friction clutch that when subjected to a compressive force transmits a torque between the clutch housing and the second input shaft, wherein said first friction clutch is placed radially outward of the second friction clutch;
a first actuating unit comprising a piston that is axially displaceable and co-rotates with the clutch housing, said piston subjecting the first friction clutch to a compressive force when the first actuating unit is actuated;
a second actuating unit comprising a piston that is axially displaceable and co-rotates with the clutch housing, said piston subjecting the second friction clutch to a compressive force when the second actuating unit is actuated; wherein
the compressive force exerted by the piston of the first actuating unit and the compressive force exerted by the piston of the second actuating unit are directed in axially opposite directions with respect to each other;
the first actuating unit and the second actuating unit are substantially axially symmetric and are arranged in the radial direction within the second friction clutch;
the piston of the first actuating unit displaceably abuts with a radially inner end of the piston against a clutch hub that co-rotates with the clutch housing; and
a clutch ridge having a radial ridge portion and at least one cylindrical ridge portion connects the clutch hub with an inner disk carrier of the second friction clutch.

2. The dual clutch arrangement of claim 1, wherein the first friction clutch comprises a disk pack with outer disks and inner disks and the second friction clutch comprises a disk pack with outer disks and inner disks, wherein the outer disks of the first friction clutch and the inner disk of the second friction clutch are connected in a rotationally fixed fashion with the clutch housing such as to co-rotate therewith.

3. The dual clutch arrangement according to claim 1, wherein the piston of the first actuating means has a radial piston portion and an axial or cylindrical piston portion, wherein between an inner side of the cylindrical piston portion and an outer side of a pressure chamber wall of the first actuating unit a sealing is provided for sealing a pressure chamber.

4. The dual clutch arrangement of claim 1, wherein between an inner side of the cylindrical ridge portion of the clutch ridge and an outer side of the cylindrical piston portion of the piston of said first actuating means a sealing is provided for sealing a compensation chamber of the first actuating unit.

5. The dual clutch arrangement of claim 1, wherein the clutch ridge comprises a divider dividing an oil flow into at least one partial flow cooling at least one of the friction clutches and dividing the oil flow into at least another partial flow for the compensation chamber of the first actuating unit.

6. The dual clutch arrangement of claim 5, wherein the partial flow for cooling of the at least one friction clutch is guided through a cavity of the clutch ridge.

7. The dual clutch arrangement according to claim 1, wherein the pressing force of the piston of the first actuating unit is transmitted via a pressing body that is integrally formed with the piston into the disk pack of the first friction clutch.

8. The dual clutch arrangement according to claim 1, wherein the piston of the first actuating unit and a piston of the second actuating unit are apart from opposite orientation identical.

9. The dual clutch arrangement according to claim 1, wherein the pressure chamber wall of the first actuating unit and a pressure chamber wall of the second actuating unit are of identical design but oppositely oriented.

10. The dual clutch arrangement according to claim 1, wherein the compensation chamber of the first actuating unit and a compensation chamber of the second actuating unit are of identical design but oppositely oriented.

11. The dual clutch arrangement according to claim 1, wherein the further comprising a clutch hub that has at least one oil bore that is in oil flow connection with an oil groove having rounded or chamfered groove walls.

12. The dual clutch arrangement according to claim 1, wherein a clutch support is provided on which a clutch hub can rotate, said clutch support comprising at least one oil hole and at least one plug for closing an oil bore, said plug having a defined leakage opening.

13. The dual clutch arrangement according to claim 1, wherein the clutch hub comprises at a side that faces away from the drive train a shoulder for receiving in a rotationally fixed fashion a pump wheel.

\* \* \* \* \*

UNITED STATES PATENT AND TRADEMARK OFFICE
CERTIFICATE OF CORRECTION

| | | |
|---|---|---|
| PATENT NO. | : 8,997,961 B2 | Page 1 of 1 |
| APPLICATION NO. | : 13/392847 | |
| DATED | : April 7, 2015 | |
| INVENTOR(S) | : Marc Absenger et al. | |

It is certified that error appears in the above-identified patent and that said Letters Patent is hereby corrected as shown below:

On the Title page of the patent, (74) reads:

(74) Attorney, Agent, or Firm - Schlee IP International, P.C.; Anthony R. Schlee and should read:

(74) Attorney, Agent, or Firm - Schlee IP International, P.C.; Alexander R. Schlee Signed and Sealed this
Fourteenth Day of July, 2015

Michelle K. Lee
*Director of the United States Patent and Trademark Office*